United States Patent [19]

Maurice et al.

[11] 3,948,644

[45] Apr. 6, 1976

[54] STEEL MAKING VESSEL WITH DUST RECYCLING METHOD AND MEANS

[75] Inventors: Harvey W. Maurice, Butler; Jai K. Pearce, Pittsburgh, both of Pa.

[73] Assignee: Pennsylvania Engineering Corporation, Pittsburgh, Pa.

[22] Filed: Mar. 27, 1972

[21] Appl. No.: 238,337

[52] U.S. Cl. .......................... 75/25; 75/60; 266/15
[51] Int. Cl.² ...................... C21B 3/04; C21C 5/38
[58] Field of Search ................ 75/25, 60, 5; 266/15

[56] References Cited
UNITED STATES PATENTS

| | | | |
|---|---|---|---|
| 1,713,435 | 5/1929 | Heskamp | 75/25 |
| 1,780,833 | 11/1930 | McGurty | 75/25 |
| 2,760,856 | 8/1956 | Carney | 75/57 |
| 2,983,598 | 5/1961 | Wheatley | 75/56 |
| 3,194,651 | 7/1965 | Namy | 75/60 |
| 3,240,481 | 3/1966 | Smith | 75/60 |
| 3,311,465 | 3/1967 | Ban | 75/5 |
| 3,330,645 | 7/1967 | Moustier | 75/60 |
| 3,372,528 | 3/1968 | Hoff | 75/25 |
| 3,411,896 | 11/1968 | Urban | 75/60 |
| 3,494,107 | 2/1970 | Sackett | 266/15 |
| 3,497,194 | 2/1970 | Hoff | 75/25 |

*Primary Examiner*—Peter D. Rosenberg
*Attorney, Agent, or Firm*—Fred Wiviott

[57] ABSTRACT

The flue gases from a steel refining furnace or vessel are delivered to a gas cleaning system in which the dust is removed and collected in slurry form. The slurry is dried and reduced to dust again after which it is delivered to a storage vessel. The dust is transported pneumatically from the storage vessel to tuyeres in the steel refining vessel and thereby injected back into the molten metal within the vessel. The dust is rich in iron oxide and contributes to the steel yield from the refining vessel.

6 Claims, 1 Drawing Figure

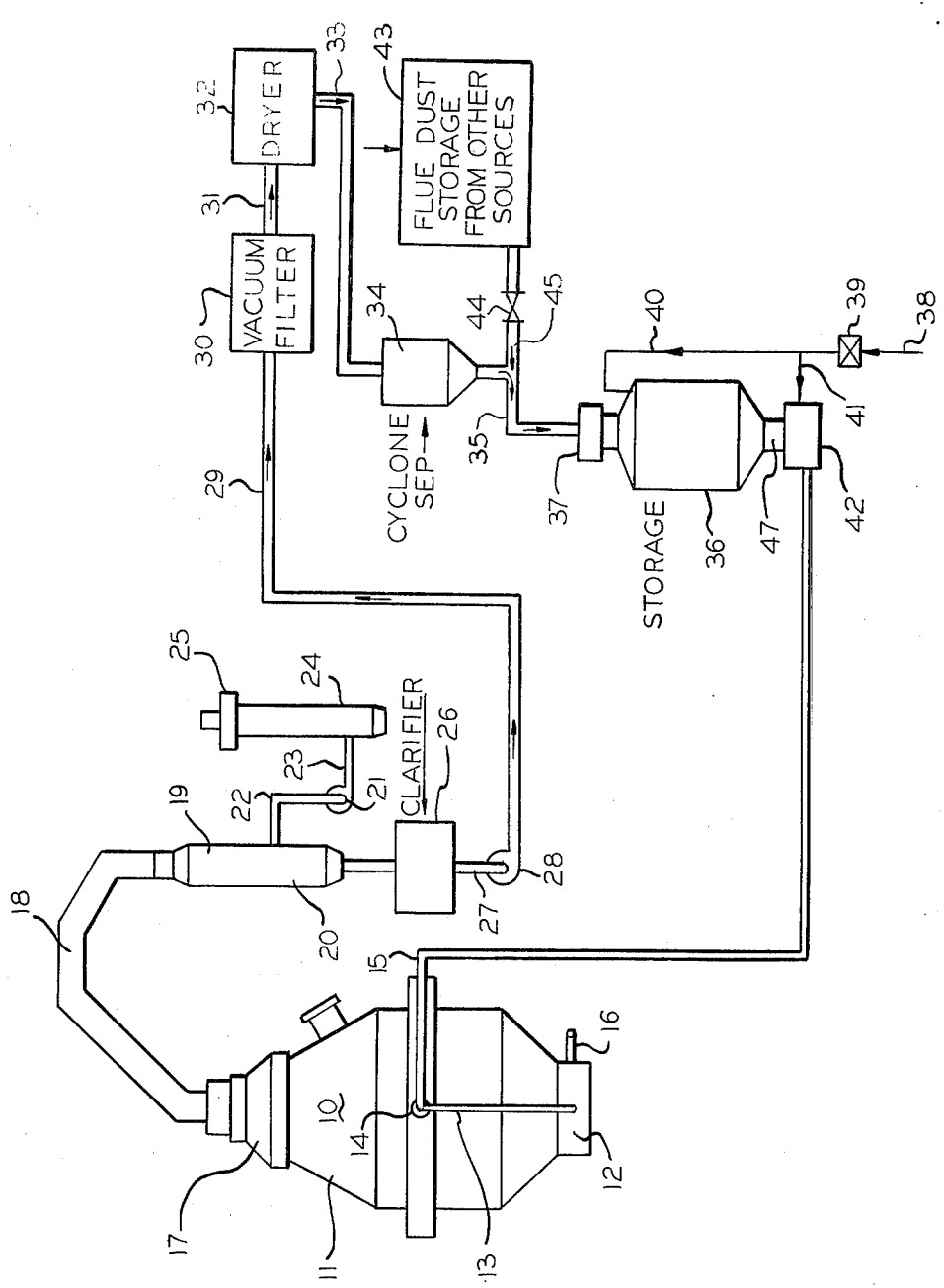

STEEL MAKING VESSEL WITH DUST RECYCLING METHOD AND MEANS

BACKGROUND OF THE INVENTION

As is well known, conversion of pig iron to steel in open hearth furnaces, top blown basic oxygen converters and bottom blown converters is accompanied by emission of gases and smoke. The particulate matter comprising the smoke includes a significant amount of finely divided iron oxide. It is undesirable to permit the smoke to enter the atmosphere and pollute it. Moreover, the loss of iron oxide from the molten metal within the vessel means that the steel yield is reduced since some of the iron is lost as smoke. In most steel making plants, the particulate matter constituting the smoke is separated from the flue gases in either an electrostatic precipitator or in a wet flue gas scrubber. The gases are variously discharged to the atmosphere, or burned or collected and used as fuel gas since they contain carbon moxoxide which is combustible. The finely divided solids were usually treated as waste.

SUMMARY OF THE INVENTION

An object of this invention is to reclaim the iron oxide containing solids from the flue gases for reuse as a source of iron in the refining process.

Another object of this invention is to improve the economics of the steel making process and thereby offset the increased cost of raw materials and of meeting pollution emission requirements by effectively using the dust to increase the yield of steel from the refining vessel or furnace.

In general terms, an illustrative embodiment of the invention is associated with a bottom blown steel converter vessel. A hood over the vessel mouth and a duct system connected thereto delivers the flue gases to a wet scrubber. The separated gas is delivered to a stack and burned. The collected finely divided solids or smoke is in slurry form and is delivered to a clarifier wherein most of the water is separated. The wet solids are then subjected to vacuum filtration and drying whereupon they are delivered to a pressurized storage vessel. The solids are then delivered pneumatically back to the bottomblown converter vessel as required in connection with the refining process. How the foregoing objects and other more specific objects of the invention are achieved will appear in the course of a more detailed description of an illustrative embodiment of the invention which will be set forth shortly hereinafter in reference to the drawing.

DESCRIPTION OF THE DRAWING

The single FIGURE is a schematic diagram of a steel converter vessel associated with the new dust reclaiming system.

DESCRIPTION OF A PREFFERED EMBODIMENT

Although the new dust reclaiming method and apparatus may be used in connection with various steel converter vessels and furnaces such as bottom and top blown basic oxygen converters and open hearth furnaces, for the sake of brevity the invention will be illustrated in connection with a bottom blown steel converter vessel which is designated generally in the drawing by the reference numeral 10. Vessel 10 comprises a metal shell 11 which is lined with refractory material in a known manner. There is a chamber 12 at the bottom of vessel 10 and this chamber contains two different headers, not shown, which are for distributing gases and gases containing finely divided materials to a set of tuyeres, not shown, which project through the bottom of the vessel. The bottom blown tuyere arrangement, which is known to those who are currently involved in the steel making arts and requires no further elaboration. Suffice it to say that the tuyeres each have two independent passageways for injecting gases and gases in which finely divided materials are entrained into the molten metal within vessel 10. Each tuyere is comprised of two concentric pipes the center one of which delivers oxygen and finely divided materials entrained therein into the molten metal within the vessel. The other passageway which results from the second pipe being concentric with the first is used to inject a hydrocarbon gas into the melt concurrently with injection of oxygen. The hydrocarbon cracks into its hydrogen and carbon constituents where the gas evolves from the tuyere at its interface with the molten metal. This cracking process is endothermic and results in cooling the tuyeres so that they do not deteriorate under the intense heat that results from the reaction between oxygen and constituents of the melt which is being refined.

Gases such as oxygen containing finely divided material is delivered to the tuyeres by means of a pipe 13 which runs down the side of the vessel and connects with the header within chamber 12. Pipe 13 is the outlet of a rotary joint 14. The rotary joint connects to a stationary pipe 15 which is in turn connected to one or more sources of oxygen or other gases and gases in which finely divided materials are entrained, as will be explained more fully hereinafter. The hydrocarbon gas may be delivered to the tuyeres through a pipe 16 which may lead to a rotary joint, not shown, on the rear side of vessel 10. This rotary joint connects to a pressure regulated source, not shown, of hydrocarbon gas such as propane.

Vessel 10 is supported in a trunnion ring 16 which is adapted to tilt on a horizontal axis to thereby tilt the vessel with it. The trunnion pins, their journals, and the tilt drive mechanism are not shown because they are conventional.

Pig iron is converted to steel in vessel 10 by injecting oxygen into the hot molten metal along with other gases and solids which are needed for effectuating the necessary metallurgical reactions. Thus, gases and materials are injected into the molten metal and large quantities of reaction gases and smoke evolve therefrom. These gases and smoke are collected by a hood 17 which is situated over the mouth of vessel 10. Hood 17 is coupled with a duct 18 which delivers the dirty gases to a wet scrubber 19. Scrubbers suitable for this duty are well known to those involved in the steel making art. It is sufficient for present purposes to observe that scrubber precipitates the finely divided solids from the gases whereupon the solids settle in slurry form in the bottom region 20 of the scrubber. The separated gases are withdrawn from the scrubber by a blower 21 whose inlet pipe 22 leads to the scrubber and whose outlet pipe 23 leads to a stack or chimney 24. This stack is equipped with a burner 25 at which the carbon monoxide and other combustible gases are completely oxidized or burned and discharged to the atmosphere. In some installations, the gases are delivered by blower 21 to suitable storage vessels for ultimate use as a fuel which can be done because of the high combustible carbon monoxide content of the gases.

In accordance with the invention, the slurry which is collected in the bottom region 20 of scrubber 19 and which includes an appreciable portion of finely divided iron oxide is delivered to a clarifier 26 which is shown in block form because it is a known device. In clarifier 26 much of the water is separated from the slurry and more concentrated slurry is withdrawn through a pipe 27 which connects with the input of a pump 28. Pump 28 conveys the heavy slurry through a conduit 29 to a vacuum filter 30. Vacuum filters are known to those involved in the steel making arts and need not be described in greater detail. It is sufficient to say that additional water is removed from the mass of finely divided solids in the vacuum filter 30. From filter 30 the semi-dried material is transported through a conduit 31 to a dryer 32 wherein substantially all of the residual water is driven from the mass of finely divided material. Various fuel fired dryers are commercially available for performing the duty required by dryer 32 so it need not be described in any greater detail.

After drying, the coalesced solids are delivered by means of a conduit 33 to a separator 34 which may be of the well known cyclone type. Separators of this type further dry the particulate material which is passed through them and are capable of separating particles of different masses. In the present example, however, separation is inconsequential and the finely divided materials are delivered from the separator through a conduit 35 to a storage vessel 36. The storage vessel 36 is the ultimate destination of the finely divided materials for that part of the system which has been described up to this point but it will be understood that there may be intermediate bins or other suitable vessels, not shown, interposed between separator 34 and pressure vessel 36 so as to be able to accommodate and store all of the finely divided material that is produced by the system.

The fine materials containing a high percentage of iron oxide are admitted into storage vessel 36 through a gas-lock type valve 37 at the top of the vessel. Vessel 36, is of course, depressurized while finely divided material is being admitted to it.

Vessel 36 may be pressurized from a pipe 38 which leads to a high pressure source of gas, not shown, of any type that is useful in connection with refining in vessel 10 but most generally oxygen is used. The gas is delivered through a regulating valve 39 to a line 40 which communicates with the interior of the storage vessel to pressurize the volume above the finely divided materials which are in its bottom region. A branch line 41 leads to a chamber 42 in which there is suitable known apparatus for entraining finely divided solids coming down throat 47 from the storage vessel in gas which is delivered from pipe 41. The gas entrained finely divided material which in this case is rich in iron oxide is delivered from chamber 42 by means of pipe 15 to the rotary joint 14 and ultimately to the tuyeres in the bottom of vessel 10. The finely divided solids are thereby injected into the molten metal. Of course, the iron oxide so injected is, to a large extent, reduced to pure iron which contributes to the yield of the batch of steel which is being produced in the converter vessel. Thus, iron oxide which left vessel 10 from some preceding heat in the form of smoke is returned and reclaimed to perform a useful purpose in a subsequent heat.

Although various kinds of apparatus were demonstrated as being useful for effecting drying of the slurry between the wet gas scrubber 19 and storage vessel 36 it will be understood that the apparatus is merely suggestive and that the primary object is to deliver the finely divided solids derived from the smoke to a storage vessel in dry form so as to facilitate injection into a converter vessel for reuse. It should also be understood that the method hereinabove described is applicable to any type of converter vessel or furnace which is adapted for direct injection of powdered materials to the interior thereof. Furthermore, the finely divided particulate matter may be obtained from one kind of refining system such as an open hearth furnace, a blast furnace, or a top-blown basic oxygen furnace and then delivered through valve 44 and pipe 45 to a storage bin 43 for further delivery to pressure vessel 36 from which the dust or particulate matter is transported to the bottom tuyeres for use in another vessel such as vessel 10. Thus, the important aspect of the invention is realized which is to dispose of dust from any metallurgical process and to abate pollution by injecting the dust directly into molten metal through submerged tuyeres irrespective of the type of metallurgical vessel to which such tuyeres may be adapted.

Those skilled in the art will appreciate that the bottom blown converter vessel system herein described is normally associated with other storage vessels similar to storage vessel 36 and that their outputs are connected to pipe 15 which serves as a common header and enables delivery of various finely divided materials to the converter vessel on demand.

It is claimed:

1. A method of simultaneously reducing dust pollution and increasing product yield in steel refining comprising the steps of:

containing in a refractory lined metallurgical vessel a quantity of molten ferrous metal to be treated, injecting an oxygen containing gas into said molten metal and below the surface thereof through tuyeres extending through refractory lining of said vessel, the injection of oxygen resulting in the emission of off-gases having finely divided solid particulate matter suspended therein, separating said finely divided particles from said off-gases, passing said particles to a storage vessel, connecting a source of a pressurized oxygen containing gas to the tuyeres of a metallurgical vessel for injecting said gas below the surface thereof, selectively connecting said storage vessel to said pressurized gas stream for entraining at least a portion of said separated particles therein for injecting said particles in said gas stream through the tuyeres of a metallurgical vessel.

2. The method of claim 1 wherein said step of separating said finely divided particles from said off-gases includes the further steps of wet scrubbing the mixture of off-gases and particulate material, then reducing the moisture content of the slurry produced by said scrubber, and drying said particulate matter prior to entraining the same in said gas stream.

3. A metal refining system for simultaneously reducing dust pollution and increasing product yield comprising:

a refractory lined metallurgical vessel for containing a charge of molten iron containing metal to be treated, said vessel having an opening for receiving said charge, tuyere means for supplying a process gas to said molten metal, said tuyere means extending through said refractory lining and having a discharge end beneath the level of said molten metal, fume hood means disposed adjacent said opening for collecting off-gases and suspended particulate material produced during metal refining, separation means coupled to said hood means for receiving said off-gases and particulate material and for separating the same, storage means for receiving said separated particulate material from said separating means, a source of pressurized oxygen containing gas, conduit means for coupling said tuyere means to said source of pressurized gas, means for selectively coupling said storage means to said conduit means to entrain said particulate material in said pressurized gas and whereby said entrained particulate material is injected into said vessel and beneath the level of molten metal through said tuyere means.

4. The system as claimed in claim 3 wherein said separation means includes serially connected wet gas scrubber means coupled to said hood means, filter means, and dryer means for providing a dry finely divided particulate material to said storage means.

5. The system set forth in claim 3 wherein:
a. said separation means comprises wet gas scrubber means which produces a wet mass of particulate matter, and
b. dryer means communicating with the scrubber means for receiving the wet mass therefrom and for drying the same before transport of the dried matter to said storage means.

6. The invention set forth in claim 3:
a. said separation means comprises wet gas scrubber means which produces a wet mass of particulate matter,
b. clarifier means coupled with the separation means to receive the wet mass therefrom, said clarifier means removing some of the water from said mass of particulate matter,
c. vacuum filter means coupled to receive said matter from the clarifier means,
d. dryer means coupled to receive said matter from the vacuum filter means, and
e. a centrifugal separator for receiving said matter from the dryer means prior to transport to the aforesaid storage means.

* * * * *